United States Patent
Etchegoyen et al.

(10) Patent No.: US 8,695,068 B1
(45) Date of Patent: Apr. 8, 2014

(54) DEVICE AUTHENTICATION USING DISPLAY DEVICE IRREGULARITY

(71) Applicant: Uniloc Luxembourg S. A., Luxembourg (LU)

(72) Inventors: Craig S. Etchegoyen, Plano, TX (US); Dono Harjanto, Irvine, CA (US)

(73) Assignee: Uniloc Luxembourg, S.A., Luxembourg (LU)

( * ) Notice: Subject to any disclaimer, the term of this patent is extended or adjusted under 35 U.S.C. 154(b) by 0 days.

(21) Appl. No.: 13/911,574

(22) Filed: Jun. 6, 2013

Related U.S. Application Data

(60) Provisional application No. 61/816,136, filed on Apr. 25, 2013.

(51) Int. Cl.
*G06F 21/00* (2013.01)

(52) U.S. Cl.
USPC .................. 726/5; 726/1; 713/176; 345/419; 345/473

(58) Field of Classification Search
USPC ............................................................ 726/5
See application file for complete search history.

(56) References Cited

U.S. PATENT DOCUMENTS

| | | |
|---|---|---|
| 4,118,789 A | 10/1978 | Casto et al. |
| 4,319,085 A | 3/1982 | Welch et al. |
| 4,658,093 A | 4/1987 | Hellman |
| 4,885,778 A | 12/1989 | Weiss |
| 5,291,598 A | 3/1994 | Grundy |
| 5,490,216 A | 2/1996 | Richardson, III |
| 6,158,005 A | 12/2000 | Bharathan et al. |
| 6,233,567 B1 | 5/2001 | Cohen |
| 6,243,468 B1 | 6/2001 | Pearce et al. |
| 6,536,005 B1 | 3/2003 | Augarten |
| 7,017,044 B1 | 3/2006 | Carpenter et al. |
| 7,111,167 B1 | 9/2006 | Yeung et al. |
| 7,188,241 B2 | 3/2007 | Cronce et al. |
| 7,272,728 B2 | 9/2007 | Pierson et al. |
| 7,302,590 B2 | 11/2007 | Dublish et al. |
| 7,319,987 B1 | 1/2008 | Hoffman et al. |
| 7,420,474 B1 | 9/2008 | Elks et al. |

(Continued)

FOREIGN PATENT DOCUMENTS

| | | |
|---|---|---|
| EP | 1 455 258 | 9/2004 |
| EP | 1 637 958 | 3/2006 |

(Continued)

OTHER PUBLICATIONS

Beverly, Robert, "A Robust Classifier for Passive TCP/IP Fingerprinting," *Proceedings of the 5th Passive and Active Measurement Workshop*, Apr. 2004, Juan-les-Pins, France, pp. 158-167.

(Continued)

*Primary Examiner* — Morshed Mehedi
(74) *Attorney, Agent, or Firm* — Sean D. Burdick

(57) ABSTRACT

A device authentication server authenticates a remotely located device using data representing pixel irregularities of a display of the device. Since each display will deteriorate in a unique and randomized way, a unique mapping of pixel irregularities of a display of a device will be unique. By combining unique map of pixel irregularities of a display of the remotely located device, the device can be distinguished from similar devices when other attributes alone are insufficient to uniquely identify the device.

9 Claims, 11 Drawing Sheets

(56) References Cited

U.S. PATENT DOCUMENTS

| | | | |
|---|---|---|---|
| 7,428,587 | B2 | 9/2008 | Rowland et al. |
| 7,463,945 | B2 | 12/2008 | Kiesel et al. |
| 7,617,231 | B2 | 11/2009 | Moon et al. |
| 7,779,274 | B2 | 8/2010 | Dublish et al. |
| 7,934,250 | B2 | 4/2011 | Richardson, III |
| 7,957,561 | B2* | 6/2011 | Joung et al. ............. 382/112 |
| 7,970,946 | B1 | 6/2011 | Djabarov et al. |
| 8,441,548 | B1* | 5/2013 | Nechyba et al. ........ 348/222.1 |
| 8,483,450 | B1* | 7/2013 | Derakhshani et al. ...... 382/117 |
| 2001/0026275 | A1* | 10/2001 | Moriwaki et al. ........... 345/473 |
| 2002/0047841 | A1* | 4/2002 | Moriwaki .................. 345/419 |
| 2002/0061119 | A1* | 5/2002 | Powell et al. ............... 382/100 |
| 2004/0030912 | A1 | 2/2004 | Merkle et al. |
| 2004/0062084 | A1 | 4/2004 | Layman et al. |
| 2004/0143746 | A1 | 7/2004 | Ligeti et al. |
| 2004/0187018 | A1 | 9/2004 | Owen et al. |
| 2005/0033833 | A1 | 2/2005 | Baldiga et al. |
| 2005/0050531 | A1 | 3/2005 | Lee |
| 2005/0100204 | A1* | 5/2005 | Afzal et al. ................. 382/135 |
| 2006/0088186 | A1* | 4/2006 | Era ............................. 382/100 |
| 2006/0115082 | A1* | 6/2006 | Kevenaar et al. ........... 380/216 |
| 2006/0161914 | A1 | 7/2006 | Morrison et al. |
| 2006/0200672 | A1 | 9/2006 | Calhoon et al. |
| 2006/0230317 | A1 | 10/2006 | Anderson |
| 2006/0274753 | A1 | 12/2006 | Park et al. |
| 2007/0113090 | A1 | 5/2007 | Villela |
| 2007/0136726 | A1 | 6/2007 | Freeland et al. |
| 2007/0143073 | A1 | 6/2007 | Richardson et al. |
| 2007/0219917 | A1 | 9/2007 | Liu et al. |
| 2007/0234427 | A1 | 10/2007 | Gardner et al. |
| 2009/0067666 | A1* | 3/2009 | Zhao et al. .................. 382/100 |
| 2009/0319799 | A1 | 12/2009 | Carpenter et al. |
| 2010/0235241 | A1 | 9/2010 | Wang et al. |
| 2012/0030771 | A1 | 2/2012 | Pierson et al. |

FOREIGN PATENT DOCUMENTS

| | | |
|---|---|---|
| GB | 2434724 | 8/2007 |
| WO | WO 2008/127431 | 10/2008 |
| WO | WO 2011/147845 | 1/2011 |

OTHER PUBLICATIONS

Eckersley, Peter, "How Unique is Your Web Browser?" *Lecture Notes in Computer Science*, 2010, DOI: 10.1007/978-3-542-14527-8_1, pp. 1-18.

Fink, Russ, "A Statistical Approach to Remote Physical Device Fingerprinting," *Military Communications Conference*, 2007. (Abstract only).

G. Wiesen, "What is a Device Fingerprint?", *WiseGeek*, 2003.

Heydt-Benjamin, T. S., "Ultra-low-cost True Randomness and Physical Fingerprinting," *Cryptocracy*, Sep. 10, 2007.

Johnson et al. "Dimensions of Online Behavior: Toward a User Typology," *Cyberpsycology and Behavior*, vol. 10, No. 6, pp. 773-779, 2007. XP002617349.

Kohno et al., "Remote Physical Device Fingerprinting," *IEEE Transactions on Dependable and Secure Computing*, vol. 2, No. 2, Apr.-Jun. 2005, pp. 93-108.

Lallous, "Changing Volume's Serial Number," Code Project Feb. 17, 2008, retreived from the internet on Dec. 14, 2010. XP002614149.

Lee P, "Oracle Adaptive Access Manager Reference Guide, Release 10g (10.1.4.5)," May 2009, Internet Article retrieved on Sep. 27, 2010. XP002603489.

Martone et al., "Characterization of RF Devices Using Two-tone Probe Signals," School of Electrical and Computer Engineering, Purdue University, West Lafayette, Indiana, 2007.

Microsoft , "Using Intelligence and Forensics to Protect Against Counterfeit Intelligence," *Research and Development Industry Repor*, Apr. 20, 2010, 1 page.

Muncaster et al., "Continous Multimodal Authentication Using Dynamic Baysian Networks," Second Workshop on Multimodal User Authentication, Toulouse, France, May 11-12, 2006. XP55003041.

Salo, Timothy J., "Multi-Factor Fingerprints for Personal Computer Hardware," Military Communications Conference, Piscataway, New Jersey, Oct. 29, 2007, 7 pages. XP031232751.

SecuTech Solution, Inc., "Machine Fingerprint SDK", Aug. 2006, 4 pages.

Smolens et al., "Detecting Emerging Wearout Faults," *In Proceedings of the IEEE Workshop on Silicon Errors in Logic—System Effects*, Apr. 2007, Internet Article retrieved on Sep. 30, 2010. XP002603491.

Wikipedia: "Device Fingerprint," May 5, 2009, modified Jan. 20, 2011, Internet Article retrieved on Apr. 19, 2011. XP-002603492.

Wikipedia: "Software Extension," May 28, 2009, Internet Article retrieved on Oct. 11, 2010. XP002604710.

H. Williams, et al., "Web Database Applications with PHP & MySQL", Chapter 1, "Database Applications and the Web", ISBN 0-596-00041-3, O'Reilly & Associates, Inc., Mar. 2002, avail. at: http://docstore.mik.ua/orelly/webprog/webdb/ch01_01.htm. XP002603488.

Williams, R., "A Painless Guide to CRC Error Detection Algorithms," Aug. 13, 1993, 33 pages, www.ross.net/crc/download/crc_v3.txt.

Williath, "Future Grid Portal," *VampirTrace*, Dec. 23, 2010.

Kobsa et al., "Personalised Hypermedia Presentation Techniques for Improving Online Customer Relationships," *The Knowledge Engineering Review*, © Cambridge University Press, United Kingdom, vol. 16, No. 2, 2001, pp. 111-155.

Khanna et al. "A Survey of Forensic Characterization Methods for Physical Devices," Science Direct, Jun. 14, 2006, p. 17-28.

Microsoft , "Using Intelligence and Forensics to Protect Against Counterfeit Intelligence," *Research and Development Industry Report*, Apr. 20, 2010, 1 page.

"Uniloc Addresses $40 Billion Piracy Challenge with First Global Piracy Auditing Solution as Part of New Software Copy Control Product Suite," *Product News Network*, © Thomas Publishing Company, Jul. 10, 2007, 2 pages.

Gassend et al., "Silicon Physical Random Functions" *ACM Conference on Computer and Communications*, Washington, D.C., Nov. 18-22, 2002, pp. 148-160.

Transcript from CBS Corp New, UBS Global Media Conference on Dec. 3, 2007 with Dave Poltrack by Matt Coppett, 9 pages.

* cited by examiner

DEVICE AUTHENTICATION USING DISPLAY DEVICE IRREGULARITY

This application claims priority to U.S. Provisional Application No. 61/816,136, which was filed Apr. 25, 2013, and which is fully incorporated herein by reference.

BACKGROUND OF THE INVENTION

1. Field of the Invention

The present invention relates generally to network-based computer security and more particularly to methods of and systems for authenticating a device for computer network security.

2. Description of the Related Art

Device identification through digital fingerprinting has proven to be invaluable in recent years to such technologies as security and digital rights management. In security, authentication of a person can be restricted to a limited number of previously authorized devices that are recognized by their digital fingerprints. In digital rights management, use of copyrighted or otherwise proprietary subject matter can be similarly restricted to a limited number of previously authorized devices that are recognized by their digital fingerprints.

Digital fingerprints are particularly useful in uniquely identifying computing devices that are historically know as "IBM PC compatible". Such devices have an open architecture in which various computer components are easily interchangeable with compatible but different components. There are two primary effects of such an open architecture that facilitate device identification through digital fingerprints.

The first facilitating effect is diversity of device components. Since numerous components of IBM PC compatible devices are interchangeable with comparable but different components, generation of a digital fingerprint from data associated with the respective components of the device are more likely to result in a unique digital fingerprint.

The second facilitating effect is discoverability of details of the various components of IBM PC compatible devices. Since the particular combination of components that make up a given device can vary widely and can come from different manufacturers, the components and the operating system of the device cooperate to provide access to detailed information about the components. Such information can include serial numbers, firmware version and revision numbers, model numbers, etc. This detailed information can be used to distinguish identical components from the same manufacturer and therefore improves uniqueness of digital fingerprints of such devices.

Laptop computing devices evolved from desktop computing devices such as IBM PC compatible devices and share much of the architecture of desktop computing devices, albeit in shrunken form. Accordingly, while users are much less likely to replace graphics circuitry in a laptop device and components therefore vary less in laptop devices, laptop devices still provide enough detailed and unique information about the components of the laptop device to ensure uniqueness of digital fingerprints of laptop devices.

However, the world of computing devices is rapidly changing. Smart phones that fit in one's pocket now include processing resources that were state of the art just a few years ago. In addition, smart phones are growing wildly in popularity. Unlike tablet computing devices of a decade ago, which were based on laptop device architectures, tablet devices available today are essentially larger versions of smart phones.

Smart phones are much more homogeneous than older devices. To make smart phones so small, the components of smart phones are much more integrated, including more and more functions within each integrated circuit (IC) chip. For example, while a desktop computing device can include graphics cards and networking cards that are separate from the CPU, smart phones typically have integrated graphics and networking circuitry within the CPU. Furthermore, while desktop and laptop devices typically include hard drives, which are devices rich with unique and detailed information about themselves, smart phones often include non-volatile solid-state memory, such as flash memory, integrated within the CPU or on the same circuit board as the CPU. Flash memory rarely includes information about the flash memory, such as the manufacturer, model number, etc.

Since these components of smart phones are generally tightly integrated and not replaceable, the amount and variety of unique data within a smart phone that can be used to generate a unique digital fingerprint is greatly reduced relative to older device architectures. In addition, since it is not expected that smart phone components will ever be replaced, there is less support for access to detailed information about the components of smart phones even if such information exists.

Accordingly, it is much more difficult to assure that digital fingerprints of smart phones and similar portable personal computing devices such as tablet devices are unique. What is needed is a way to uniquely identify individual devices in large populations of homogeneous devices.

SUMMARY OF THE INVENTION

In accordance with the present invention, a device authentication server authenticates a remotely located device using data representing pixel irregularities of a display of the device. Some LED monitors allow pixels to be read such that data representing the color actually shown by the pixels can be obtained. By writing test data to each pixel and reading the color displayed by the pixel, hot and dead sub-pixels can be identified. Since each display will deteriorate in a unique and randomized way, a unique mapping of pixel irregularities of a display of a device will be unique.

By combining unique map of pixel irregularities of a display of the remotely located device, the device can be distinguished from similar devices when other attributes alone are insufficient to uniquely identify the device.

For registration for subsequent authentication of the device, the device provides the device authentication server with data representing a relatively complete set of pixel irregularities, sometimes referred to as pixel irregularity data, that the device retrieves from the display. The device authentication server stores this data and uses it subsequently as reference pixel irregularity data.

In subsequent authentication of the device, the device authentication server sends a device key challenge to the device. The device key challenge specifies a randomized selection of device attribute parts to be collected from the device and the manner in which the device attribute parts are to be combined to form a device key. The device key is data that identifies and authenticates the device and includes a device identifier and pixel irregularity data.

The device authentication server authenticates the device when the device identifier of the device key identifies the device and the pixel irregularity data is consistent with the reference pixel irregularity data.

BRIEF DESCRIPTION OF THE DRAWINGS

Other systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims. Component parts shown in the drawings are not necessarily to scale, and may be exaggerated to better illustrate the important features of the invention. In the drawings, like reference numerals may designate like parts throughout the different views, wherein:

DETAILED DESCRIPTION

Figure 1:
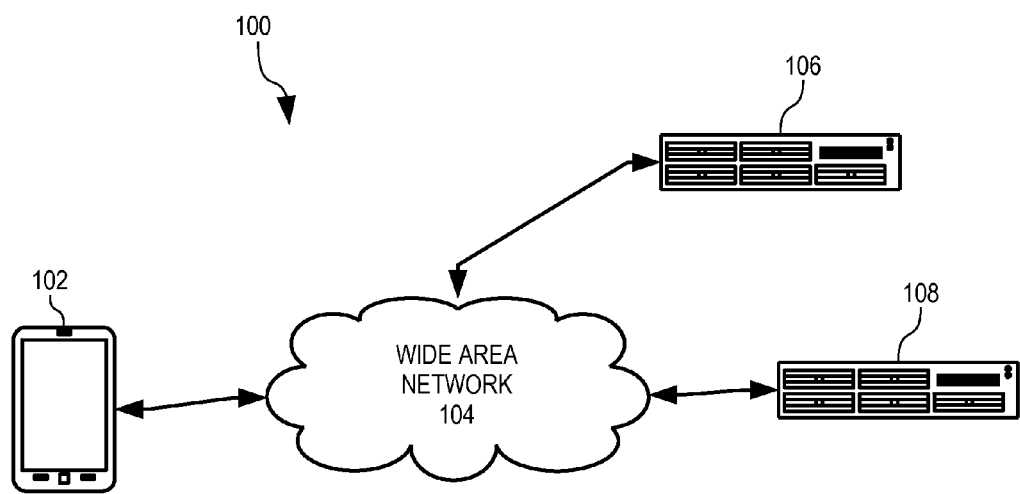
FIG. 1 is a diagram showing a computing device, a server, and a device authentication server that cooperate to identify and authenticate the device in accordance with one embodiment of the present invention.

In accordance with the present invention, a device authentication server 108 (FIG. 1) authenticates a computing device 102 using data representing pixel irregularities of a display of device 102. Pixel irregularities include dead pixels, hot pixels, and stuck pixels. These pixel irregularities differ between even otherwise identical devices since pixel failure in displays is a relatively random event.

In most displays in use today, a pixel is instructed to display a given color by writing three (3) bytes to the pixel: one byte representing an amount of red, one byte representing an amount of green, and one byte representing an amount of blue. Such bytes are frequently represented in human-readable form as six (6) hexadecimal digits: the first two (2) representing a red value, the middle two (2) representing a green value, and the last two (2) representing a blue value. For example, "FF0000" represents fully bright red, "00FF00" represents fully bright green, and "0000FF" represents fully bright blue.

While RGB color schemes are described herein, it should be appreciated that other color schemes are amenable to device identification in the manner described herein.

Each pixel typically includes three (3) sub-pixels: one red, one green, and one blue, each of which is controlled by a respective byte in an RGB color value. Dead pixels are pixels that appear black regardless of red, green, and blue (RGB) or other color values written to the pixel. In effect, a dead pixel is a pixel that displays "000000" regardless of what RGB value is written to the pixel. Hot pixels are pixels that appear white, i.e., display "FFFFFF", regardless of the RGB value written to the pixel.

Stuck pixels are pixels in which only one or more sub-pixels are dead or hot. For example, if a pixel has a dead red sub-pixel, the first byte of the displayed color will always be "00" regardless of the first byte of the RGB value written to the pixel-writing "888888" to the pixel results in display of the color "008888", thus erroneously displaying a color with a hue that is less red than intended. Similarly, if a pixel has a hot green sub-pixel, the second byte of the displayed color will always be "FF" regardless of the second byte of the RGB value written to the pixel-writing "888888" to the pixel results in display of the color "88FF88", thus erroneously displaying a color with a hue that is more green than intended.

A stuck pixel can include three (3) failed pixels. For example, if the red and blue sub-pixels are dead and the green sub-pixel is hot, the pixel will display "00FF00" regardless of the RGB value written to the pixel and will therefore always display fully bright green, giving the appearance of being "stuck" on green. In fact, dead and hot pixels can be considered special cases of stuck pixels.

Such pixel irregularities result from failure of display hardware in which data storage cells for given sub-pixels fail and become either fully on or fully off. Such hardware failures are due to IC or other digital logic hardware irregularities during manufacture and therefore happen largely randomly in the field. Accordingly, a map of pixel irregularities for a given device can be unique, even among nearly identical devices.

Device authentication system 100 (FIG. 1) includes device 102, a server 106, and a device authentication server 108 that are connected to one another through a wide area computer network 104, which is the Internet in this illustrative embodiment. Device 102 can be any of a number of types of networked computing devices, including smart phones, tablets, netbook computers, laptop computers, and desktop computers. Server 106 is a server that provides services to remotely located devices such as device 102 but that is configured to require authentication of device 102 prior to providing those services. Device authentication server 108 is a server that authenticates devices, sometimes on behalf of other computers such as server 106.

In this illustrative embodiment, a map of pixel irregularities of device 102 are combined with other attributes of device 102 to uniquely identify and authenticate device 102. Such other attributes include hardware and system configuration attributes of device 102 that make up an internal state of device 102. Device attributes are described briefly to facilitate understanding and appreciation of the present invention.

Known device record 500 (FIG. 5) includes device attributes 504, both of which are described in greater detail below. Each device attribute 504 includes an identifier 506 and a value 508. Other than maps of pixel irregularities, examples of device attributes of device 102 include a serial number of a storage device within device 102 and detailed version information regarding an operating system executing within device 102. In the example of a serial number of a storage device, identifier 506 specifies the serial number of a given storage device (such as "C:" or "/dev/sda1") as the particular information to be stored as value 508, and value 508 stores the serial number of the given storage device of device 102.

In the example of maps of pixel irregularities, value 508 will be in the form of pixel map 400 (FIG. 4) that is described in greater detail below in the context of registration of device 102 for subsequent authentication.

Figure 2:
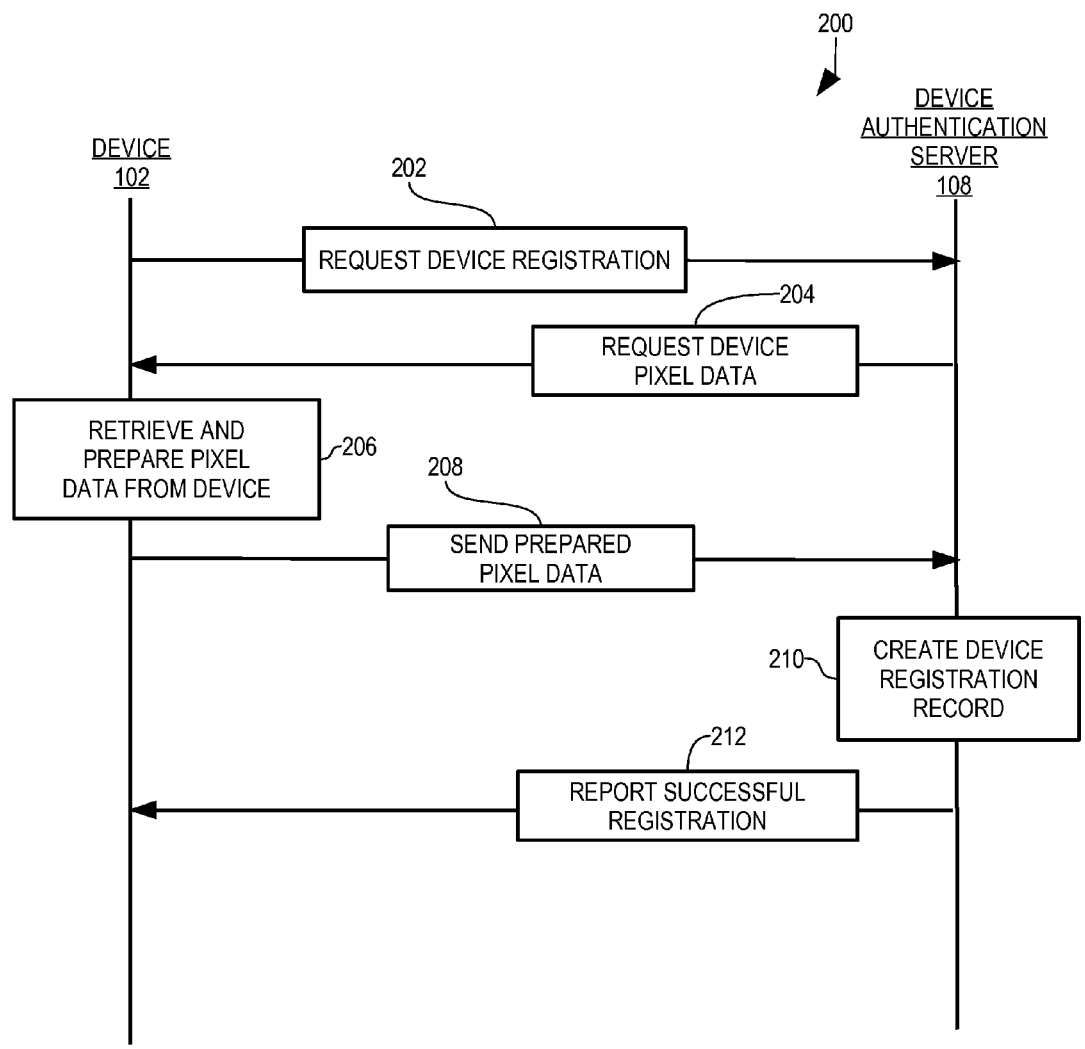
FIG. 2 is a transaction flow diagram illustrating the manner in which the device is registered with the device authentication server for subsequent authentication.

For subsequent authentication of device 102, registration in the manner illustrated in transaction flow diagram 200 (FIG. 2) retrieves tag data from device 102.

In step 202, device 102 sends a request for registration to device authentication server 108. The request can be in the form of a URL specified by the user of device 102 using a web browser 1120 (FIG. 11) executing in device 102 and conventional user interface techniques involving physical manipulation of user input devices 1108. Web browser 1120 and user input devices 1108 and other components of device 102 are described in greater detail below.

In step 204 (FIG. 2), device authentication server 108 sends a request to device 102 for device attributes of device 102.

The request sent to device 102 includes content that causes web browser 1120 (FIG. 11) of device 102 to gather attribute data representing hardware and other configuration attributes of device 102. In one embodiment, a web browser plug-in 1122 is installed in device 102 and, invoked by web browser 1120, processes the content of the web page to gather the attribute data in step 206. In other embodiments, the attribute data can be gathered in step 206 by other forms of logic of device 102, such as DDK generator 1140 installed in device 102. The various elements of device 102 and their interaction are described more completely below.

The content that causes web browser 1120 (FIG. 11) of device 102 to gather attribute data representing hardware and other configuration attributes of device 102 includes extraction logic 510 (FIG. 5) for each of the attributes web browser 1120 (FIG. 11) is to gather. In an alternative embodiment, DDK generator 1140 already includes extraction logic for all attributes and device 102 receives data identifying the particular attributes requested by device authentication server 108. Extraction logic 510 (FIG. 5) defines the manner in which a client device is to extract data to be stored as value 508 of device attribute 504.

In step 206, device 102 writes test pixel data to each and every pixel of an LED monitor 1111 (FIG. 11), reads the data stored by each pixel, and compares the data written to the data read to identify failed sub-pixels. For example, device 102 can write RGB values in which no byte is either "FF" or "00" and determining which sub-pixels store sub-pixel values that are either "FF" or "00". RGB values of "AAAAAA" and "555555" have alternating "0" and "1" bits and are good candidates for RGB values to use for testing for sub-pixel irregularities. Alternatively, device 102 can test separately by writing "FFFFFF" and "000000" to each pixel in separate passes. Writing "FFFFFF" to a pixel can test for dead sub-pixels, and writing "000000" to a pixel can test for hot sub-pixels.

While many displays do not support reading of pixel data displayed by the monitor, some LED monitors currently support such reading. In the future, reading of pixel data can be much more widely supported. In addition, while only fully on and fully off sub-pixels are described herein as pixel irregularities, it should be appreciated that monitors can make detection of other irregularities available and can then be used for device identification in the manner described herein.

Since writing to pixels causes at least properly functioning pixels to change color, writing and reading all pixels at once might produce a visible flash that could be annoying or confusing to the user. In some embodiments, no more than a few pixels are written and read at any time. The particular pixels written to at any one time are spread widely throughout the display to avoid more than a single pixel flashing in any sizable area of the display at any time. Any visible artifacts of a few individual pixels flashing at a time are much less noticeable.

Figure 4:
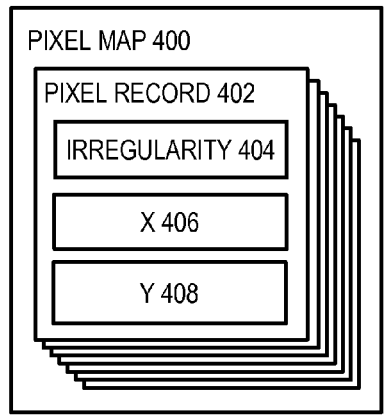
FIG. 4 is a block diagram of a map of pixel irregularities to be used for authentication of the device of FIG. 1.

In one embodiment, device 102 represents the map of pixel irregularities in a pixel map 1150 (FIG. 11) that is generally of the form shown as pixel map 400 (FIG. 4). Pixel map 400 includes a number of pixel records 402, each of which represents a pixel irregularity. The particular pixel represented by pixel record 402 (FIG. 4) is sometimes referred to as "the subject pixel" in the context of FIG. 4.

Irregularity 404 represents the particular irregularity of the subject pixel. In this illustrative embodiment, irregularity 404 represents irregularity types for each sub-pixel: red, green, and blue. The irregularity types include dead, hot, and none. A dead pixel would be represented as red=dead, green=dead, and blue=dead. A pixel in which only the blue sub-pixel is hot would be represented as red=none, green=none, and blue=hot. This can be represented in only six (6) bits, each pair representing one of the three irregularities for a respective sub-pixel: e.g., "00" for none, "01" for dead", and "10" for hot, the first two bits for red, the second two bits for blue, and the last 2 bits for green.

Figure 11:
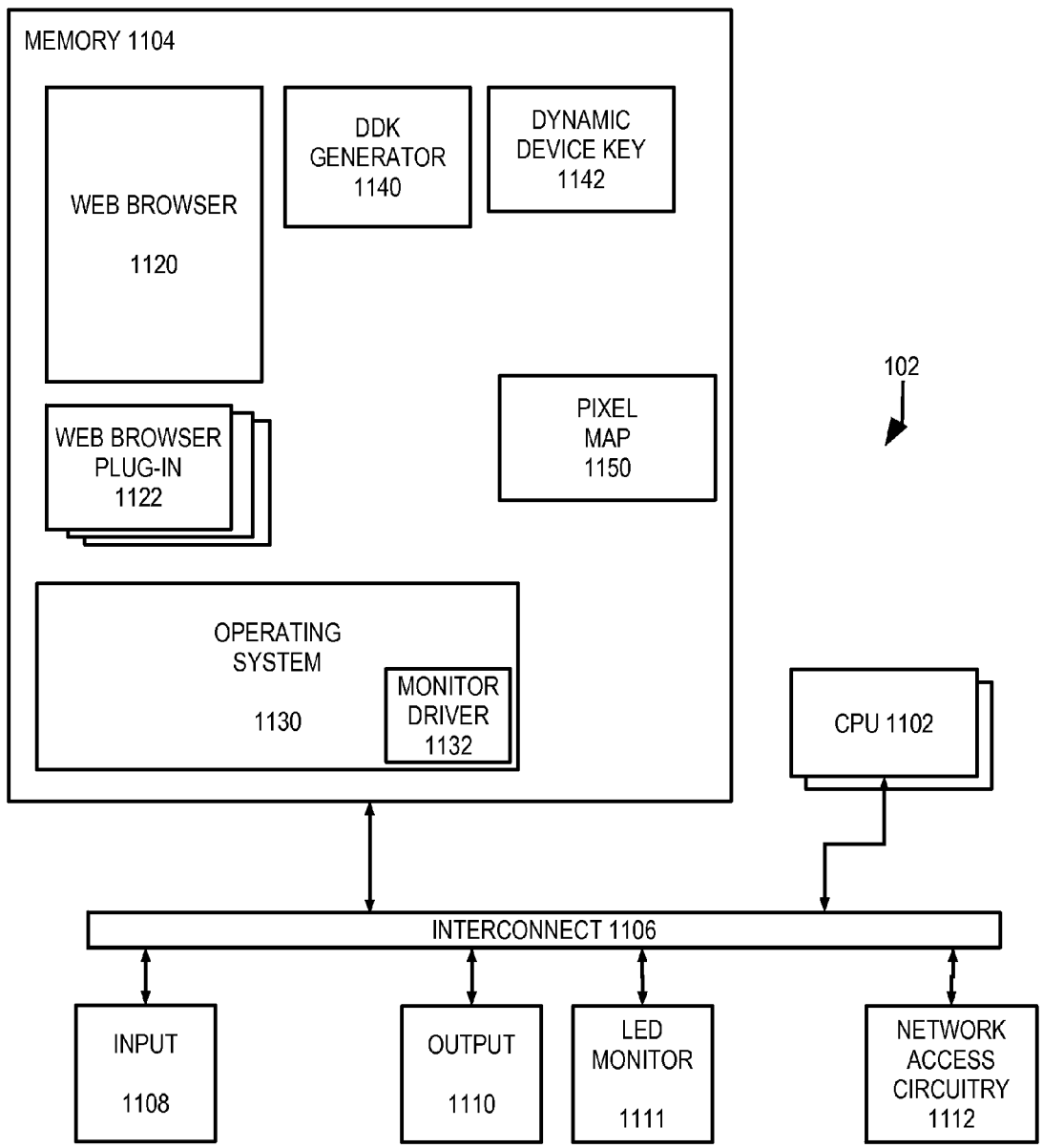
FIG. 11 is a block diagram showing in greater detail the device of FIG. 1.

X 406 and Y 408 specify the particular location of the subject pixel in LED display 1111 (FIG. 11). Thus, X 406 and Y 408 uniquely identify the subject pixel.

As a whole, pixel map 400 represents a complete map of pixel irregularities of a given display. It should be appreciated that there are many ways to represent a map of pixel irregularities of a given display.

It is not necessary that the map be complete. However, it is preferred that the particular representation of a map of pixel irregularities be one from which device authentication server 108 can assess a rate of change in pixel irregularities overall over time. Sub-pixels do not heal themselves. Accordingly, over time, a device's map of pixel irregularities should not show fewer irregularities or the absence of previously observed irregularities. In addition, the observed rate of growth of pixel irregularities should increase within a range of reasonably expected rates of growth. The representation of a map of pixel irregularities should allow assessment of an observed rate of growth.

Figure 7:
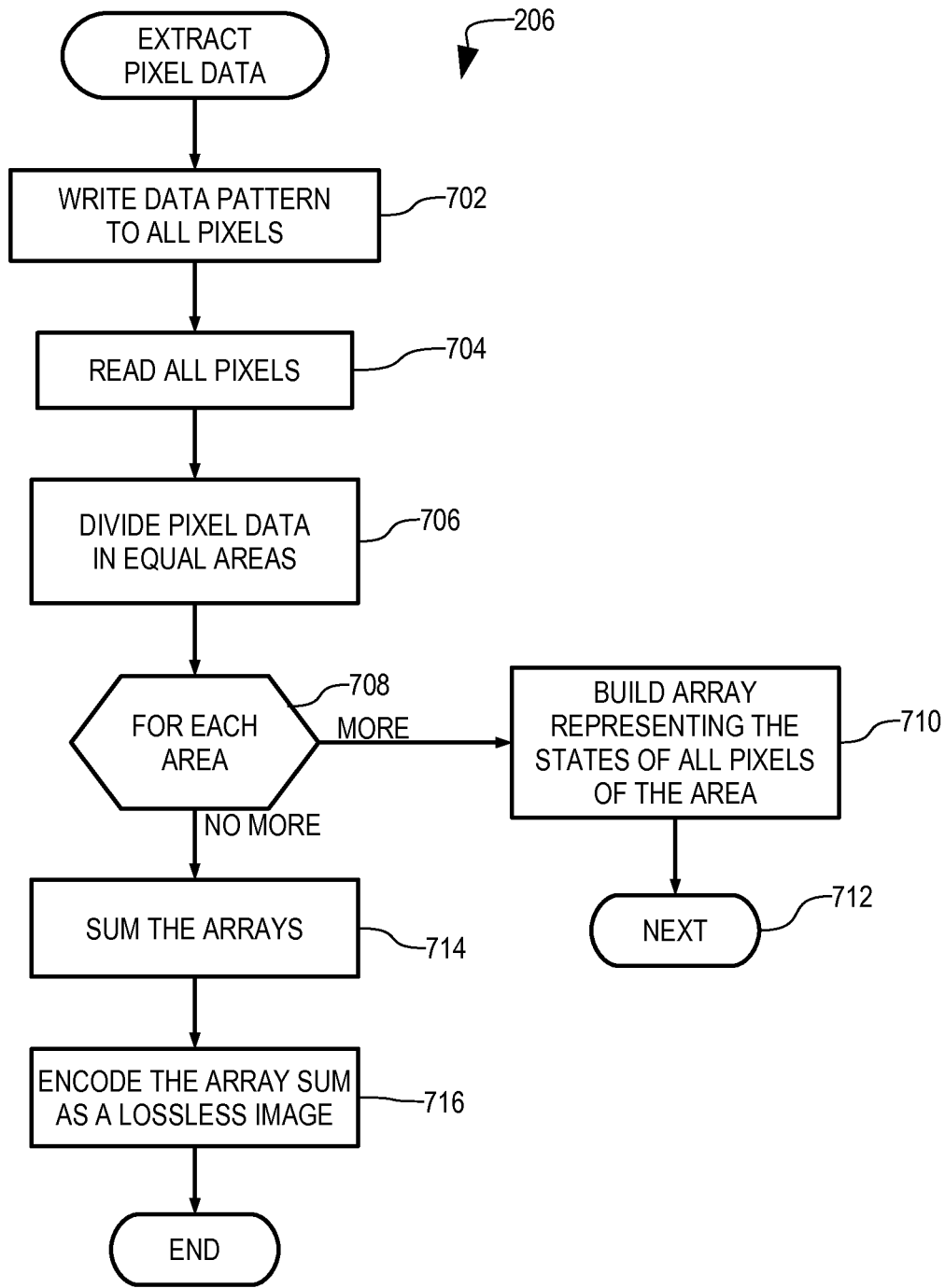
FIG. 7 is a logic flow diagram illustrating the extraction of pixel irregularity data for registration of the device.

One example of such a representation gathered in step 206 (FIG. 2) is illustrated by logic flow diagram 206 (FIG. 7). In step 702, device 102 writes test data to all pixels in the manner described above. In step 704, device 102 reads data stored at all pixels. As discussed above, the writing and reading can be done in batches of less than the entirety of the display.

Figure 12:
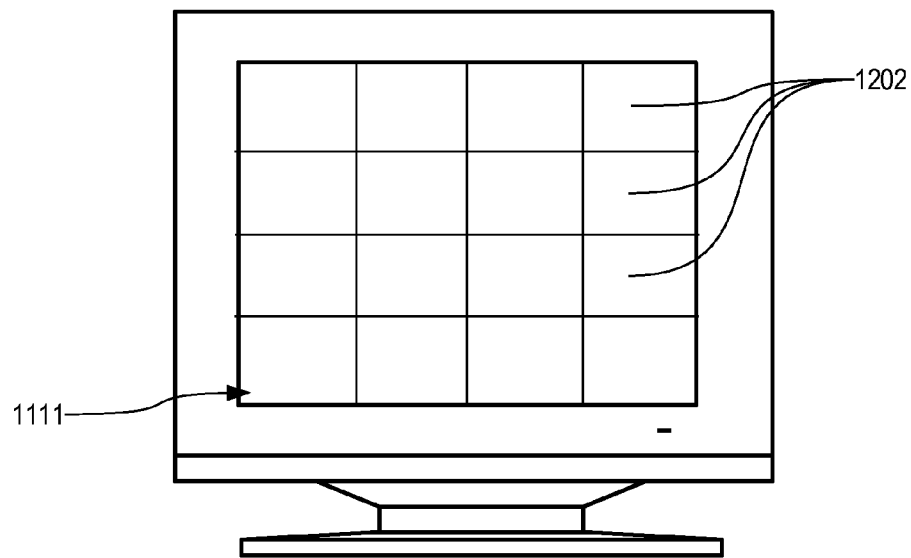
FIG. 12 is a block diagram showing division of a display of the device of FIG. 1 into equal areas in accordance with one embodiment of the present invention.

In step 706, device 102 divides the entirety of the read pixel data into areas of equal size. For example, LED monitor 1111 (FIG. 12) is divided into 16 areas 1202 of equal size.

Loop step 708 (FIG. 7) and next step 712 define a loop in which device 102 processes each of areas 1202 (FIG. 12) according to step 710 (FIG. 7). During each iteration of the loop of steps 708-712, the particular area 1202 processed by device 102A is sometimes referred to as the subject area.

Figure 13:
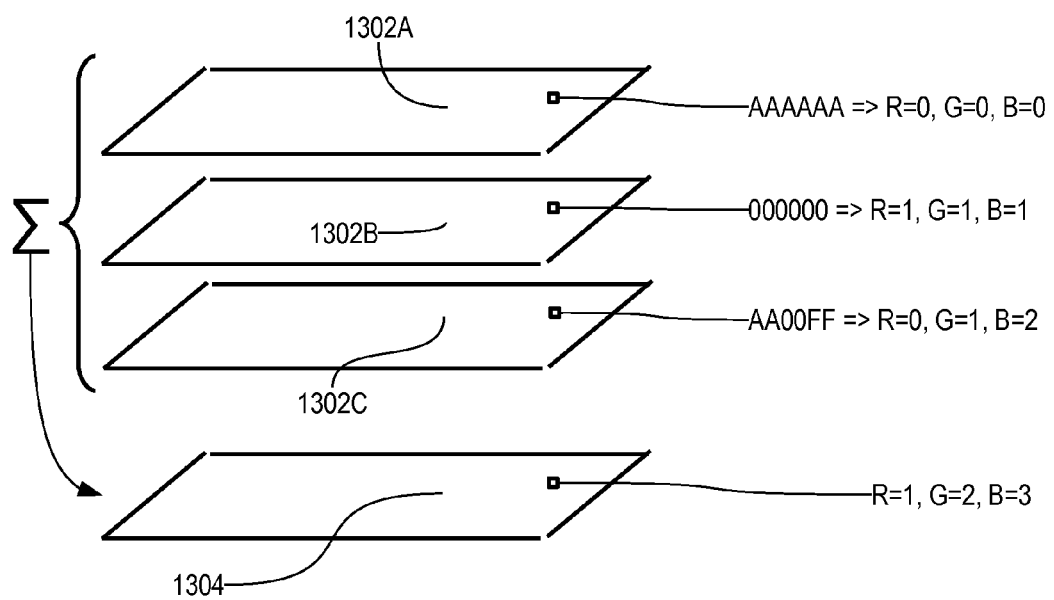
FIG. 13 is a diagram illustrating stacking of display areas to represent pixel irregularity data in accordance with one embodiment of the present invention.

In step 710, device 102 builds an array specifying sub-pixel irregularities in the subject area. FIG. 13 shows illustrative examples of such arrays as arrays 1302A-C. In this illustrative example, the test data written to all pixels in step 702 (FIG. 7) is "AAAAAA", alternating 1s and 0s in binary. In array 1302A, data read from a given location of the subject area is "AAAAAA" and therefore contains no sub-pixel irregularities. Such is represented in array 1302A at a location corresponding to the given pixel location by R=0, G=0, and B=0, indicating no sub-pixel irregularities, wherein 0 indicates no irregularity. In array 1302B, data read from the given location of the subject area is "000000" and therefore represents a dead pixel. Such is represented in array 1302B at a location corresponding to the given pixel location by R=1, G=1, and B=1, indicating three dead sub-pixels, wherein 1 indicates a dead sub-pixel. In array 1302C, data read from the given location of the subject area is "AA00FF" and therefore represents a stuck pixel in which the green sub-pixel is dead and the blue sub-pixel is hot. Such is represented in array 1302C at a location corresponding to the given pixel location by R=0, G=1, and B=2, indicating three dead sub-pixels, wherein 2 indicates a hot sub-pixel.

After the subject array is built and represents any and all sub-pixel irregularities of the subject area, processing by device 102 transfers through next step 712 to loop step 708 in which device 102 processes the next area according to the loop of steps 708-712. When all areas have been processed according to step 710, processing by device 102 transfers from loop step 708 to step 714.

In step 714, device 102 sums the arrays built in the multiple performances of step 710. Device 102 sums arrays 1302A-C (FIG. 13) by summing the sub-pixel values at corresponding locations and storing the summed values in a corresponding location in array 1304. For example, summing the sub-pixel values of arrays 1302A-C described above, the sub-pixel values for the same location within array 1304 is R=1, G=2, B=3.

In step 716 (FIG. 7), device 102 encodes array 1304 in a lossless image format. Array 1304 is already in a form that can readily be represented as a bitmap image. However, a number of losslessly compressed image formats are known and can be used to represent array 1304 using significantly less data. Lossless compression preserves all pixel data perfectly such that it can be retrieved after decompression. In this illustrative example of such a losslessly compressed image format is the known PNG (portable network graphics) format. After step 716, processing according to logic flow diagram 206, and therefore step 206 (FIG. 2), completes.

The result is that pixel map 1150 (FIG. 11) is in the form of a PNG image and is therefore lightweight for transportation through computer networks. It is preferred that the number of areas 1202 (FIG. 12) of equal size is limited in number to no more than 128. Accordingly, the sum of sub-pixel states (0-2 in value) will never exceed the maximum value of a sub-pixel—256 ("FF" in hexadecimal).

In this illustrative embodiment, device 102—in particular, web browser plug-in 1122 (FIG. 11) or DDK generator 1140—encrypts the attribute data using a public key of device authentication server 108 and public key infrastructure (PKI) in step 206, thereby encrypting the attribute data such that it can only be decrypted by device authentication server 108.

In step 208 (FIG. 2), device 102 sends the attribute data that was gathered in step 206 to device authentication server 108.

In step 210, device authentication logic 1020 (FIG. 10) of device authentication server 108 creates a device registration record for device 102 from the received attribute data. Device authentication server 108 creates a device registration record in the form of known device record 500 (FIG. 5) for device 102 by creating a globally unique identifier for device 102 as device identifier 502 (FIG. 5) and storing the values of the respective attributes, including the tag data, received in step 208 (FIG. 2) as value 508 (FIG. 5) in respective device attributes 504. Known device record 500 is described more completely below in greater detail.

In step 212 (FIG. 2), device authentication server 108 sends a report of successful registration to device 102, providing device identifier 502 (FIG. 5) of device 102 for subsequent identification. After step 212 (FIG. 2), processing according to transaction flow diagram 200 completes and device 102 is registered for subsequent authentication with device authentication server 108.

Known device record 500 (FIG. 5) is a registration record and, in this illustrative example, represents registration of device 102. Known device record 500 includes a device identifier 502 and a number of device attributes 504 which are described briefly above. Each device attribute 504 includes an identifier 506 specifying a particular type of information and a value 508 representing the particular value of that type of information from device 102. For example, if identifier 506 specifies a serial number of a given storage device, value 514 stores the serial number of that storage device within device 102. Similarly, if identifier 506 specifies pixel irregularities for a display of device 102, value 508 stores data representing the map of pixel irregularities.

In this illustrative embodiment, value 508 stores the tag data in the form of pixel map 400 (FIG. 4) or in a lossless image format as described above. In alternative embodiments, value 508 (FIG. 5) can store an abstraction of the pixel map. For example, value 508 can store a hash of the pixel map.

Device attribute 504 (FIG. 5) also includes extraction logic 510, comparison logic 512, alert logic 514, and adjustment logic 516. The particular device attribute represented by device attribute 504 is sometimes referred to as "the subject device attribute" in the context of FIG. 5.

Extraction logic 510 specifies the manner in which the subject device attribute is extracted by device 102. Logic flow diagram 206 (FIG. 7), described above, is an example of extraction logic 510 for a map of pixel irregularities.

Figure 8:
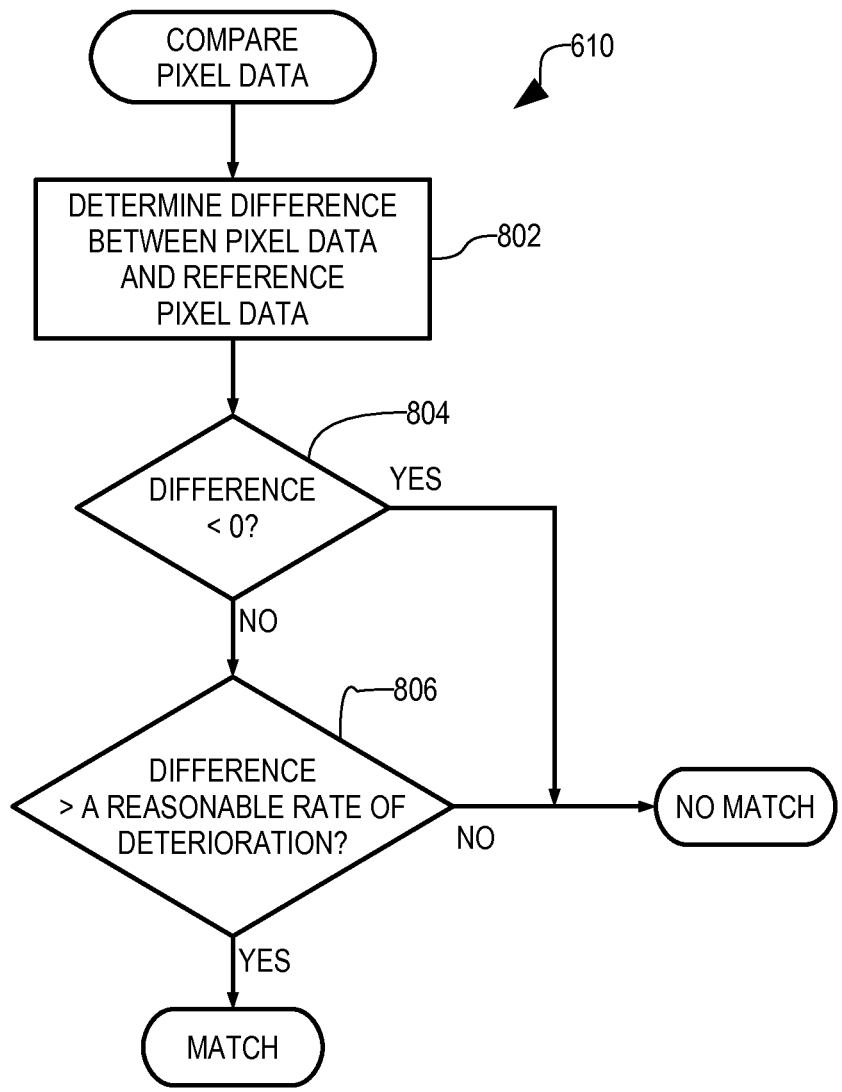
FIG. 8 is a logic flow diagram illustrating comparison of pixel irregularity data to reference pixel irregularity data for authentication of the device.

Comparison logic 512 specifies the manner in which the subject device attribute is compared to a corresponding device attribute to determine whether device attributes match one another. An example of comparison logic 512 is described more completely below in conjunction with logic flow diagram 610 (FIG. 8).

Alert logic 514 can specify alerts of device matches or mismatches or other events. Examples of alert logic 514 include e-mail, SMS messages, and such to the owner of device 102 and/or to a system administrator responsible for proper functioning of device 102.

Adjustment logic 516 specifies the manner in which the subject device attribute is to be adjusted after authentication. For example, if the map of pixel irregularities received for authentication indicates further pixel deterioration (greater irregularities) than indicated by the map of pixel irregularities already stored in value 508, adjustment logic 516 can cause value 508 to be updated to store the newly received map of pixel irregularities.

Device attribute 504 is shown to include the elements previously described for ease of description and illustration. However, it should be appreciated that a device attribute 504 for a given device can include only identifier 506 and value 508, while a separate device attribute specification can include extraction logic 510, comparison logic 512, alert logic 514, and adjustment logic 516. In addition, all or part of extraction logic 510, comparison logic 512, alert logic 514, and adjustment logic 516 can be common to attributes of a given type and can therefore be defined for the given type.

Figure 3:
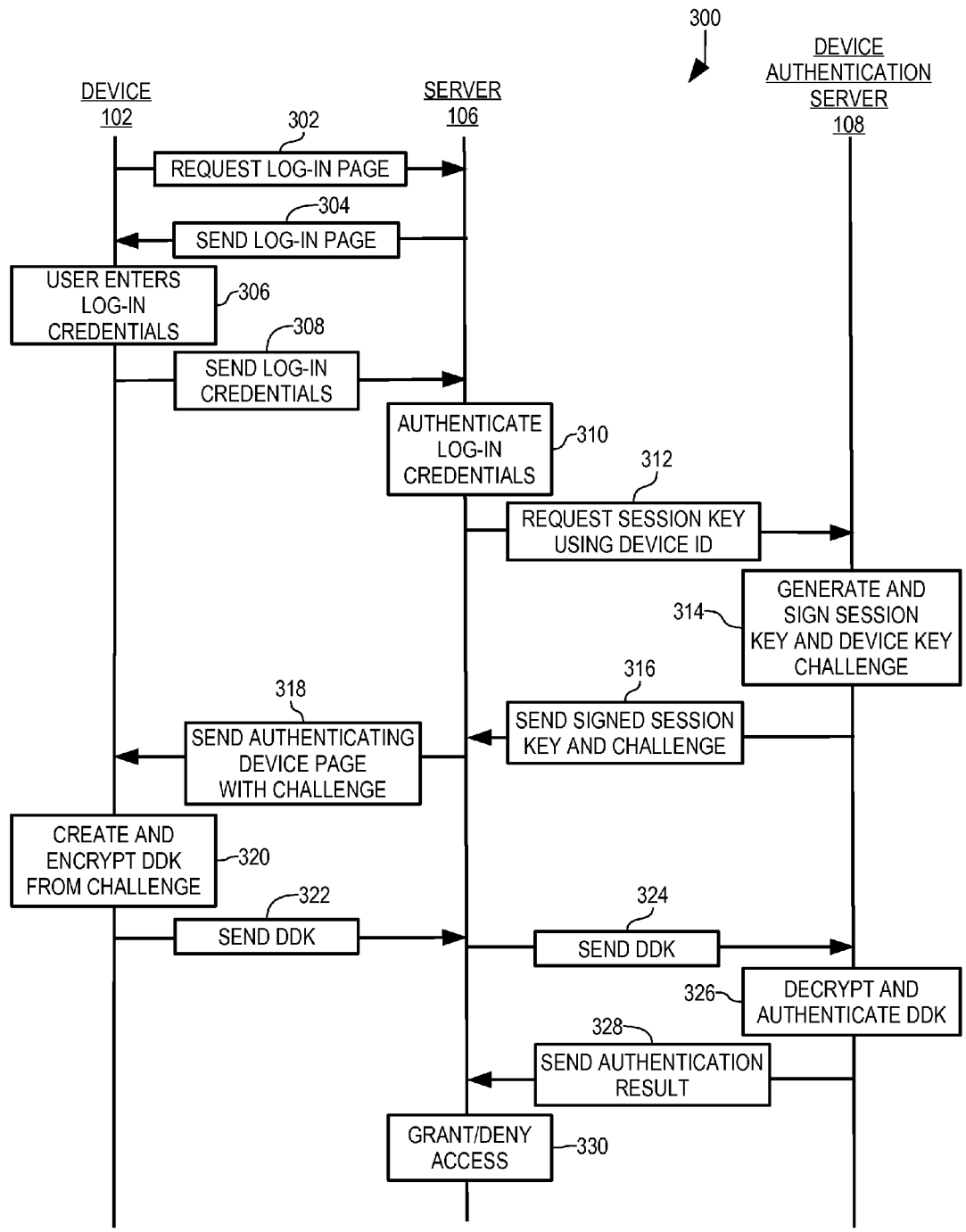
FIG. 3 is a transaction flow diagram illustrating the manner in which the device, the server, and the device authentication server of FIG. 1 cooperate to authenticate the device.

Transaction flow diagram 300 (FIG. 3) illustrates the use of device authentication server 108 to authenticate device 102 with server 106.

In step 302, device 102 sends a request for a log-in web page to server 106 by which the user can authenticate herself. The request can be in the form of a URL specified by the user of device 102 using web browser 1120 (FIG. 11) and conventional user interface techniques involving physical manipulation of user input devices 1108.

In step 304 (FIG. 3), server 106 sends the web page that is identified by the request received in step 302. In this illustrative example, the web page sent to device 102 includes content that defines a user interface by which the user of device 102 can enter her authentication credentials, such as a user name and associated password for example.

In step 306, web browser 1120 (FIG. 11) of device 102 executes the user interface and the user of device 102 enters her authentication credentials, e.g., by conventional user interface techniques involving physical manipulation of user input devices 1108. While the user is described as authenticating herself in this illustrative example, it should be appreciated that device 102 can be authenticated without also requiring that the user of device 102 is authenticated.

In step 308 (FIG. 3), device 102 sends the entered authentication credentials to server 106. In this illustrative embodiment, device 102 also sends an identifier of itself along with the authentication credentials. Server 106 authenticates the authentication credentials in step 310, e.g., by comparison to previously registered credentials of known users. If the credentials are not authenticated, processing according to transaction flow diagram 300 terminates and the user of device 102 is denied access to services provided by server 106. Conversely, if server 106 determines that the received credentials are authentic, processing according to transaction flow diagram 300 continues.

In step 312 (FIG. 3), server 106 sends a request to device authentication server 108 for a session key using the device identifier received with the authentication credentials.

In response to the request, device authentication server 108 generates and cryptographically signs a session key. Session keys and their generation are known and are not described herein. In addition, device authentication server 108 creates a device key challenge and encrypts the device key challenge using a public key of device 102 and PKI.

To create the device key challenge, device authentication server 108 retrieves the known device record 500 (FIG. 5) representing device 102 using the received device identifier and comparing it to device identifier 502. The device key challenge specifies all or part of one or more of device attribute 504 to be included in the device key and is described in greater detail below.

In step 316 (FIG. 3), device authentication server 108 sends the signed session key and the encrypted device key challenge to server 106.

In step 318, server 106 sends a "device authenticating" page to device 102 along with the device key challenge. The "device authenticating" page includes content that provides a message to the user of device 102 that authentication of device 102 is underway and content that causes device 102 to produce a dynamic device key in the manner specified by the device key challenge.

The device key challenge causes web browser 1120 (FIG. 11) of device 102 to generate a device identifier, sometimes referred to herein as a dynamic device key (DDK) for device 102, e.g., dynamic device key 1142. In one embodiment, a web browser plug-in 1122 is installed in client device 102 and, invoked by web browser 1120, processes the content of the web page to generate the DDK. In other embodiments, DDK 1142 of device 102 can be generated by other forms of logic of device 102, such as DDK generator 1140, which is a software application installed in device 102.

Figure 5:
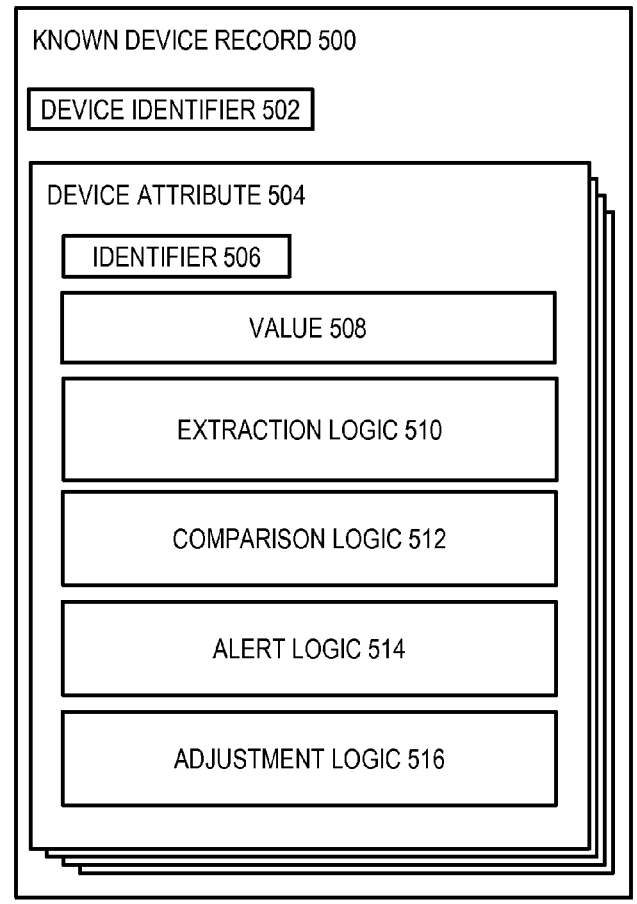
FIG. 5 is a block diagram of a known device record used by the device authentication server to authenticate the device.

The device key challenge specifies the manner in which DDK 1142 is to be generated from the attributes of device 102 represented in device attributes 504 (FIG. 5). The challenge specifies a randomized sampling of attributes of device 102, allowing the resulting DDK 1142 to change each time device 102 is authenticated. There are a few advantages to having DDK 1142 represent different samplings of the attributes of device 102. One is that any data captured in a prior authentication of device 102 cannot be used to spoof authentication of device 102 using a different device when the challenge has changed. Another is that, since only a small portion of the attributes of device 102 are used for authentication at any time, the full set of attributes of device 102 cannot be determined from one, a few, several, or even many authentications of device 102.

The device key challenge specifies items of information to be collected from hardware and system configuration attributes of device 102 and the manner in which those items of information are to be combined to form DDK 1142. In this embodiment, the challenge specifies one or more attributes related to pixel irregularity data of device 102.

To provide greater security, DDK 1142 includes data representing the pixel irregularity data obfuscated using a nonce included in the challenge. While use of randomized parts of the pixel irregularity data precludes capture of any single DDK to be used in subsequent authentication, use of the nonce thwarts collection of randomized parts of the pixel irregularity data over time to recreate enough of tag log 400 (FIG. 4) to spoof authentication in response to a given challenge.

In step 320 (FIG. 3), device 102 gathers pixel irregularity data for inclusion in the DDK according to the device key challenge. In this illustrative embodiment, device 102 performs step 320 in a manner analogous to that described above with respect to logic flow diagram 206 (FIG. 7).

Once DDK 1142 (FIG. 11) is generated according to the received device key challenge, device 102 encrypts DDK 1142 using a public key of device authentication server 108 and PKI.

In step 322 (FIG. 3), device 102 sends the encrypted dynamic device key to server 106, and server 106 sends the encrypted dynamic device key to device authentication server 108 in step 324.

In step 326, device authentication logic 1020 of device authentication server 108 decrypts and authenticates the received DDK. Step 326 is shown in greater detail as logic flow diagram 326 (FIG. 6).

In step 602, device authentication logic 1020 identifies device 102. In this illustrative embodiment, the received DDK includes a device identifier corresponding to device identifier 502 (FIG. 5). Device authentication logic 1020 identifies device 102 by locating a known device record 500 in which device identifier 502 matches the device identifier of the received DDK.

In test step 604 (FIG. 6), device authentication logic 1020 determines whether device 102 is identified. In particular, device authentication logic 1020 determines whether a known device record with a device identifier matching the device identifier of the received DDK is successfully found in known device data 1030. If so, processing transfers to step 606. Otherwise, processing transfers to step 616, which is described below.

Figure 6:
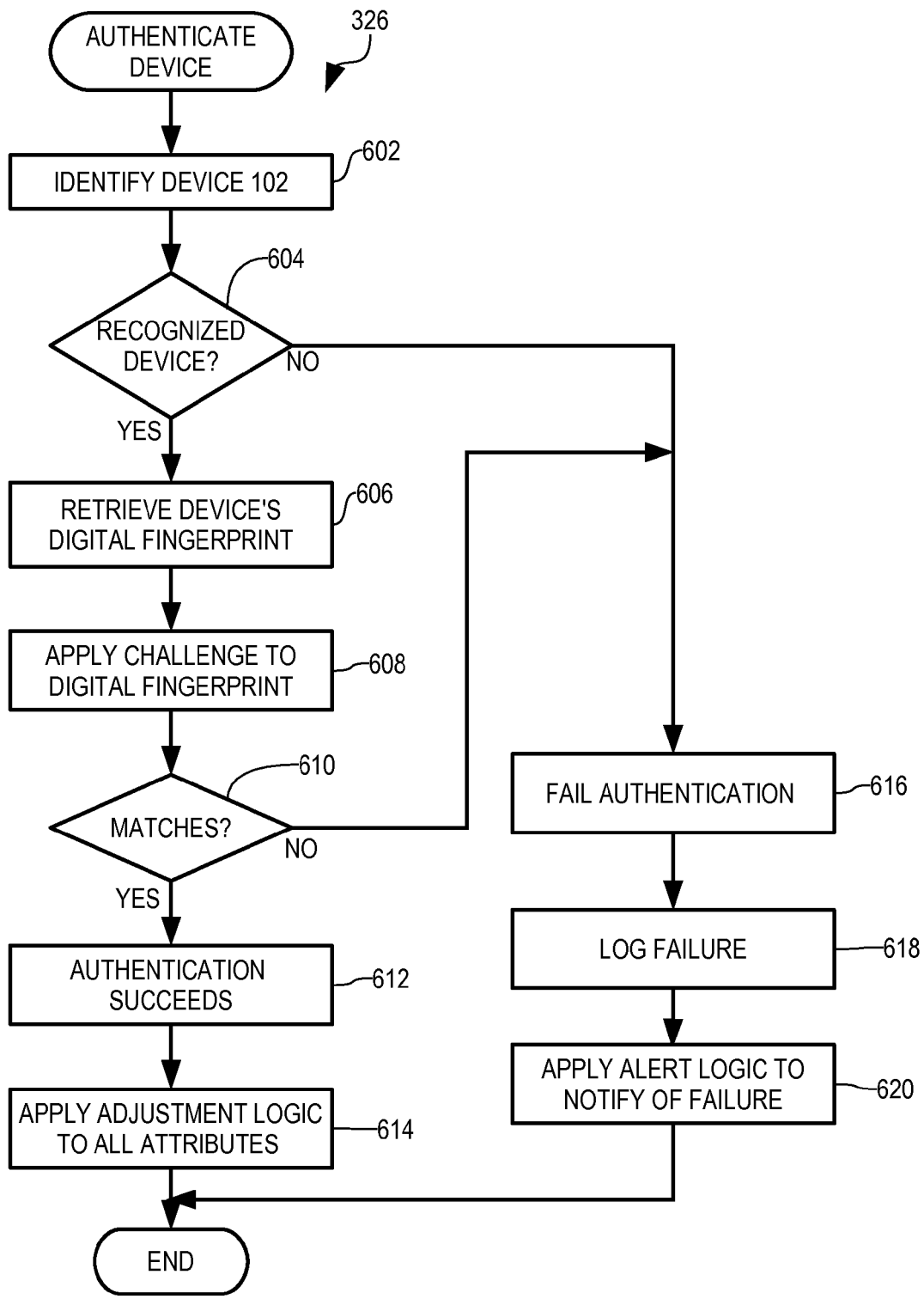
FIG. 6 is a logic flow diagram of an authentication process by which the device authentication server authenticates the device.

In step 606, device authentication logic 1020 retrieves the known device record 500 (FIG. 5) for the identified device, e.g., device 102, using the identifier determined in step 602 (FIG. 6).

In step 608, device authentication logic 1020 authenticates the received DDK using the retrieved device record 500 (FIG. 5). Device authentication logic 1020 authenticates by applying the same device key challenge sent in step 318 (FIG. 3) to the known device record 500 (FIG. 5) that corresponds to the identified device. In this illustrative embodiment, the device key challenge produces a DDK in which a portion of the DDK generated from non-interactive attributes can be parsed from a portion generated from interactive attributes, such that device 102 can be authenticated separately from the user of device 102.

In test step 610 (FIG. 6), device authentication logic 1020 determines whether the received DDK authenticates device 102 by comparing the resulting DDK of step 608 to the received DDK. In this illustrative embodiment, device authentication logic 1020 uses comparison logic 512 (FIG. 5) for each of the device attributes 504 included in the device key challenge.

The portion of step 320 in which device authentication logic 1020 determines whether the pixel irregularity portion of the dynamic device key matches is shown in greater detail as logic flow diagram 610 (FIG. 8).

In step 802, device authentication logic 1020 determines the an amount by which the pixel irregularity data from the dynamic device key exceeds the reference pixel irregularity data from known device record 500.

In test step 804 (FIG. 8), device authentication logic 1020 determines whether the amount determined in step 802 is negative, i.e., that the pixel irregularity data from the dynamic device key is less irregular than the reference pixel irregularity data from known device record 500. LED displays are presumed to not be able to heal; accordingly, device 102 determines that the pixel irregularity data does not match if the amount is negative. Conversely, if the amount is non-negative, processing transfers to test step 806.

In test step 806 (FIG. 8), device authentication logic 1020 determines whether the amount determined in step 802 exceeds a predetermined reasonable rate of deterioration. To make such a determination, the reference pixel irregularity data from known device record 500 is associated with a time stamp specifying when the reference pixel irregularity data was first stored in known device record 500. Accordingly, device authentication logic 1020 can determine over what time span the pixel irregularities of device 102 is reported to have grown.

If the amount determined in step 802 exceeds the predetermined reasonable rate of deterioration, device authentication logic 1020 determines that the pixel irregularity data does not match. Conversely, if the amount determined in step 802 does not exceed the predetermined reasonable rate of deterioration, device authentication logic 1020 determines that the pixel irregularity data match.

In this illustrative embodiment, the matching of the pixel irregularity data is not dispositive of whether the dynamic device key as a whole matches. Instead, the match or lack thereof influences an overall estimated likelihood that device 102 is, in fact, the device represented by known device record 500 (FIG. 5).

If the received DDK does not authenticate device 102, processing transfers to step 616 and authentication fails or, alternatively, to step 314 (FIG. 3) in which device authentication logic 1020 sends another device key challenge to re-attempt authentication. If the received DDK authenticates device 102, processing transfers to step 612.

In step 612, device authentication logic 1020 determines that device 102 is successfully authenticated.

In step 614 (FIG. 6), device authentication logic 1020 applies adjustment logic 516 (FIG. 5) of each of device attributes 504 uses to generate the received DDK. For example, adjustment logic 516 can specify that, since device 102 is authenticated, device authentication logic 1020 incorporates the newly received pixel irregularity data into value 508. After step 614 (FIG. 6), processing according to logic flow diagram 326, and therefore step 326, completes.

As described above, authentication failure at either of test steps 604 and 610 transfers processing to step 616. In step 616, device authentication logic 1020 determines that device 102 is not authentic, i.e., that authentication according to logic flow diagram 326 fails.

In step 618, device authentication logic 1020 logs the failed authentication and, in step 620, applies alert logic 514 (FIG. 5) to notify various entities of the failed authentication. After step 620 (FIG. 6), processing according to logic flow diagram 326, and therefore step 326, completes.

In step 328 (FIG. 3), device authentication server 108 sends data representing the result of authentication of device 102 to server 106.

In step 330, server 106 determines whether to continue to interact with device 102 and in what manner according to the device authentication results received in step 328.

Figure 9:
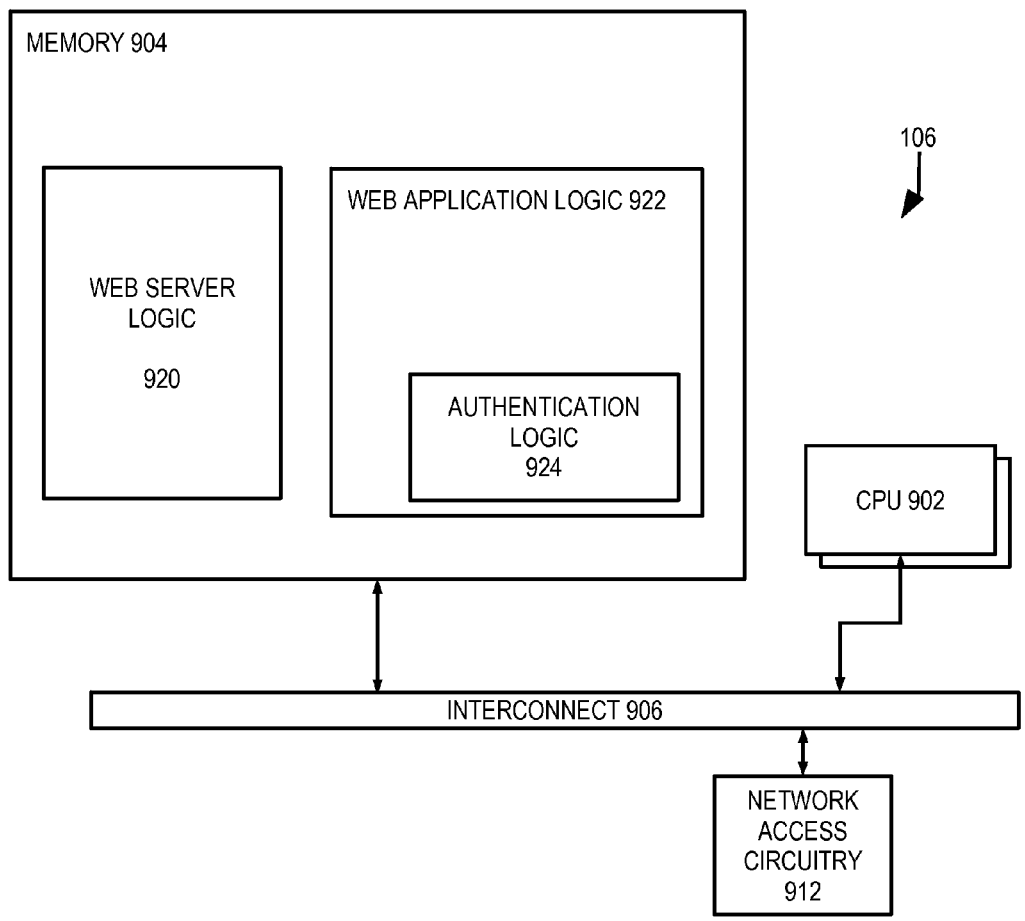
FIG. 9 is a block diagram showing in greater detail the server of FIG. 1.

Server computer 106 is shown in greater detail in FIG. 9. Server 106 includes one or more microprocessors 902 (collectively referred to as CPU 902) that retrieve data and/or instructions from memory 904 and execute retrieved instructions in a conventional manner. Memory 904 can include generally any computer-readable medium including, for example, persistent memory such as magnetic and/or optical disks, ROM, and PROM and volatile memory such as RAM.

CPU 902 and memory 904 are connected to one another through a conventional interconnect 906, which is a bus in this illustrative embodiment and which connects CPU 902 and memory 904 to network access circuitry 912. Network access circuitry 912 sends and receives data through computer networks such as wide area network 104 (FIG. 1).

A number of components of server 106 are stored in memory 904. In particular, web server logic 920 and web application logic 922, including authentication logic 924, are all or part of one or more computer processes executing within CPU 902 from memory 904 in this illustrative embodiment but can also be implemented using digital logic circuitry.

Web server logic 920 is a conventional web server. Web application logic 922 is content that defines one or more pages of a web site and is served by web server logic 920 to client devices such as device 102. Authentication logic 924 is a part of web application logic 922 that carries out device authentication in the manner described above.

Figure 10:
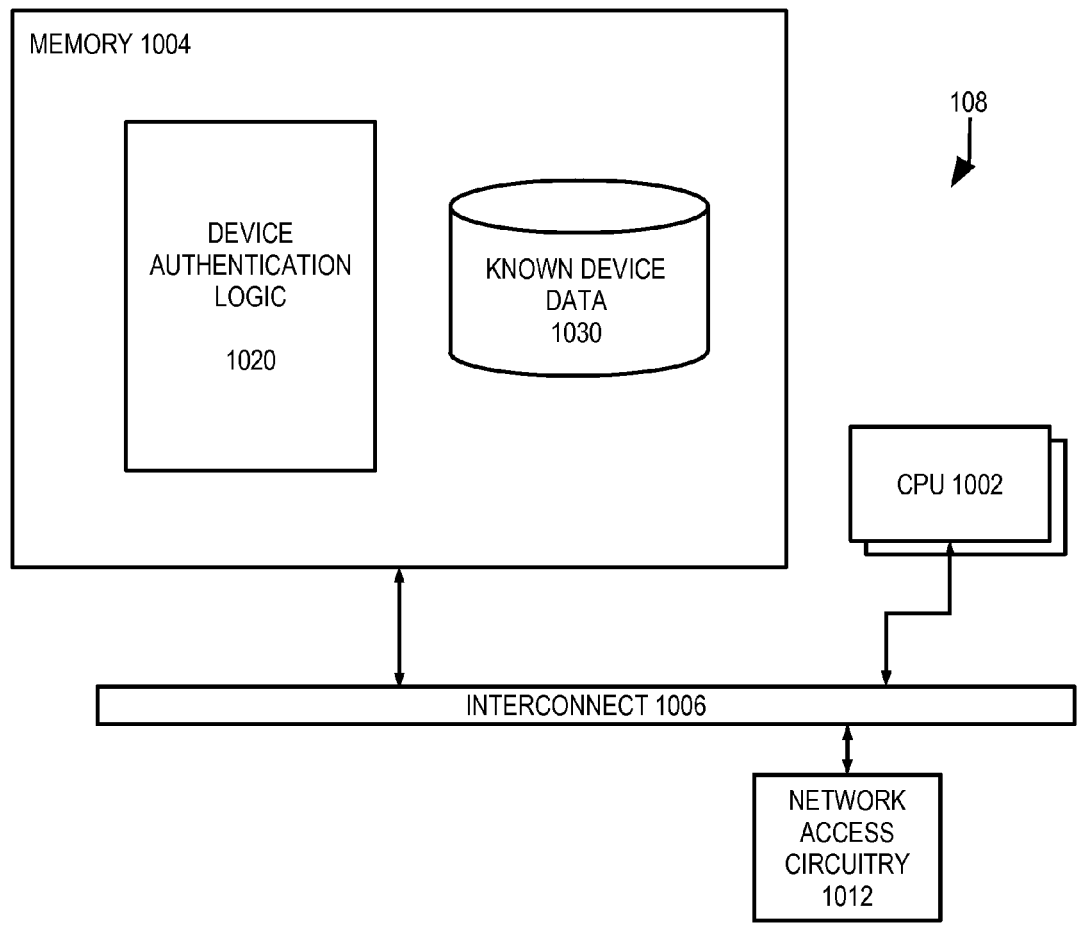
FIG. 10 is a block diagram showing in greater detail the device authentication server of FIG. 1.

Device authentication server 108 is shown in greater detail in FIG. 10. Device authentication server 108 includes one or more microprocessors 1002 (collectively referred to as CPU 1002), memory 1004, a conventional interconnect 1006, and network access circuitry 1012, which are directly analogous to CPU 902 (FIG. 9), memory 904, conventional interconnect 906, and network access circuitry 912, respectively.

A number of components of device authentication server 108 (FIG. 10) are stored in memory 1004. In particular, device authentication logic 1020 is all or part of one or more computer processes executing within CPU 1002 from memory 1004 in this illustrative embodiment but can also be implemented using digital logic circuitry. Known device data 1030 is data stored persistently in memory 1004 and includes known device records such as known device record 500 (FIG. 5) for all devices that can be authenticated by device authentication logic 1020. In this illustrative embodiment, known device data 1030 is organized as all or part of one or more databases.

Device 102 is a personal computing device and is shown in greater detail in FIG. 11. Device 102 includes one or more microprocessors 1102 (collectively referred to as CPU 1102) that retrieve data and/or instructions from memory 1104 and execute retrieved instructions in a conventional manner. Memory 1104 can include generally any computer-readable medium including, for example, persistent memory such as magnetic and/or optical disks, ROM, and PROM and volatile memory such as RAM.

CPU 1102 and memory 1104 are connected to one another through a conventional interconnect 1106, which is a bus in this illustrative embodiment and which connects CPU 1102 and memory 1104 to one or more input devices 1108, output devices 1110, and network access circuitry 1112. Input devices 1108 can include, for example, a keyboard, a keypad, a touch-sensitive screen, a mouse, a microphone, and one or more cameras. Input devices 1108 detect physical manipulation by a human user and, in response to such physical manipulation, generates signals representative of the physical manipulation and sends the signals to CPU 1102. Output devices 1110 can include, for example, a display—such as a liquid crystal display (LCD)—and one or more loudspeakers. LED monitor 1111 is an LED monitor used to display visual data to the user. Network access circuitry 1112 sends and receives data through computer networks such as wide area network 104 (FIG. 1).

A number of components of device 102 are stored in memory 1104. In particular, web browser 1120, operating system 1130, DDK generator 1140, and social networking application 1144 are each all or part of one or more computer processes executing within CPU 1102 from memory 1104 in this illustrative embodiment but can also be implemented using digital logic circuitry. As used herein, "logic" refers to (i) logic implemented as computer instructions and/or data within one or more computer processes and/or (ii) logic implemented in electronic circuitry.

Web browser plug-ins 1122 are each all or part of one or more computer processes that cooperate with web browser 1120 to augment the behavior of web browser 1120. The manner in which behavior of a web browser is augmented by web browser plug-ins is conventional and known and is not described herein.

Operating system 1130 is a set of programs that manage computer hardware resources and provide common services for application software such as web browser 1120, web browser plug-ins 1122, and DDK generator 1140. Operating system 1130 includes a monitor driver 1132 that communicates at a device level with LED monitor 1111 to write pixel data to, and read pixel data from, LED monitor 1111.

DDK generator 1140 facilitates authentication of device 102 in the manner described above.

Pixel map 1150 is data stored persistently in memory 1104 and each can be organized as all or part of one or more databases. Pixel map 1150 is generally of the structure of pixel map 400 (FIG. 4).

The above description is illustrative only and is not limiting. The present invention is defined solely by the claims which follow and their full range of equivalents. It is intended that the following appended claims be interpreted as including all such alterations, modifications, permutations, and substitute equivalents as fall within the true spirit and scope of the present invention.

What is claimed is:

1. A method for identifying a remotely located device, the method comprising:
   receiving device identification data from the device, wherein the device identification data includes:
      a device identifier, wherein the device identifier is a unique identifier of one of a number of known devices; and
      pixel irregularity data, wherein the pixel irregularity represents one or more pixel irregularities of at least one monitor of the device and wherein the pixel irregularity data is derived by the remotely located device by, for each of one or more pixels of a display of the remotely located device: (i) writing test data to the pixel, (ii) reading display data from the pixel, wherein the display data specifies a color currently displayed for the pixel, and (iii) comparing the test data to the display data to identify an irregularity of the pixel;
   determining that the device identifier identifies the device;
   comparing the pixel irregularity data to corresponding reference pixel irregularity data previously stored for the device;
   determining that the pixel irregularity data is consistent with the corresponding reference pixel irregularity data if the pixel irregularity data (i) does not indicate less pixel irregularity than the reference pixel irregularity data, (ii) does not indicate the absence of any pixel irregularity previously observed in the reference pixel irregularity data, and (iii) does not indicate greater pixel irregularity than the reference pixel irregularity data by more than a predetermined rate of deterioration; and
   authenticating the device as a recognized device upon determining that the pixel irregularity data is consistent with the corresponding reference pixel irregularity data.

2. The method of claim 1 wherein the pixel irregularity data represents one or more failed sub-pixels of a display of the remotely located device.

3. The method of claim 1 wherein the pixel irregularity data is in the form of a losslessly compressed image format.

4. A non-transitory computer readable medium useful in association with a computer that includes one or more processors and a memory, the computer readable medium including computer instructions that are configured to cause the computer, by execution of the computer instructions in the one or more processors from the memory, to identify a remotely located device by at least:
   receiving device identification data from the device, wherein the device identification data includes:
      a device identifier, wherein the device identifier is a unique identifier of one of a number of known devices; and
      pixel irregularity data, wherein the pixel irregularity represents one or more pixel irregularities of at least one monitor of the device and wherein the pixel irregularity data is derived by the remotely located device by, for each of one or more pixels of a display of the remotely located device: (i) writing test data to the pixel, (ii) reading display data from the pixel, wherein the display data specifies a color currently displayed for the pixel, and (iii) comparing the test data to the display data to identify an irregularity of the pixel;
   determining that the device identifier identifies the device;

comparing the pixel irregularity data to corresponding reference pixel irregularity data previously stored for the device;

determining that the pixel irregularity data is consistent with the corresponding reference pixel irregularity data if the pixel irregularity data (i) does not indicate less pixel irregularity than the reference pixel irregularity data, (ii) does not indicate the absence of any pixel irregularity previously observed in the reference pixel irregularity data, and (iii) does not indicate greater pixel irregularity than the reference pixel irregularity data by more than a predetermined rate of deterioration; and authenticating the device as a recognized device upon determining that the pixel irregularity data is consistent with the corresponding reference pixel irregularity data.

5. The computer readable medium of claim 4 wherein the pixel irregularity data represents one or more failed sub-pixels of a display of the remotely located device.

6. The computer readable medium of claim 4 wherein the pixel irregularity data is in the form of a losslessly compressed image format.

7. A computer system comprising:

at least one processor;

a computer readable medium that is operatively coupled to the processor;

network access circuitry that is operatively coupled to the processor; and device identification logic (i) that executes at least in part in the processor from the computer readable medium and (ii) that, when executed, causes the processor to identify a remotely located device by at least:

receiving device identification data from the device, wherein the device identification data includes:

a device identifier, wherein the device identifier is a unique identifier of one of a number of known devices; and pixel irregularity data, wherein the pixel irregularity represents one or more pixel irregularities of at least one monitor of the device and wherein the pixel irregularity data is derived by the remotely located device by, for each of one or more pixels of a display of the remotely located device: (i) writing test data to the pixel, (ii) reading display data from the pixel, wherein the display data specifies a color currently displayed for the pixel, and (iii) comparing the test data to the display data to identify an irregularity of the pixel;

determining that the device identifier identifies the device;

comparing the pixel irregularity data to corresponding reference pixel irregularity data previously stored for the device;

determining that the pixel irregularity data is consistent with the corresponding reference pixel irregularity data if the pixel irregularity data (i) does not indicate less pixel irregularity than the reference pixel irregularity data, (ii) does not indicate the absence of any pixel irregularity previously observed in the reference pixel irregularity data, and (iii) does not indicate greater pixel irregularity than the reference pixel irregularity data by more than a predetermined rate of deterioration; and authenticating the device as a recognized device upon determining that the pixel irregularity data is consistent with the corresponding reference pixel irregularity data.

8. The computer system of claim 7 wherein the pixel irregularity data represents one or more failed sub-pixels of a display of the remotely located device.

9. The computer system of claim 7 wherein the pixel irregularity data is in the form of a losslessly compressed image format.

\* \* \* \* \*